US009676587B1

(12) United States Patent
Bigbee, Jr. et al.

(10) Patent No.: US 9,676,587 B1
(45) Date of Patent: Jun. 13, 2017

(54) APPARATUS AND METHOD FOR SPOOLING WIRE

(71) Applicant: ENCORE WIRE CORPORATION, McKinney, TX (US)

(72) Inventors: William T. Bigbee, Jr., Melissa, TX (US); John L. Rhoads, McKinney, TX (US)

(73) Assignee: Encore Wire Corporation, McKinney, TX (US)

( * ) Notice: Subject to any disclaimer, the term of this patent is extended or adjusted under 35 U.S.C. 154(b) by 0 days.

(21) Appl. No.: 15/134,254

(22) Filed: Apr. 20, 2016

Related U.S. Application Data

(63) Continuation-in-part of application No. 14/659,165, filed on Mar. 16, 2015, which is a continuation of application No. 13/545,501, filed on Jul. 10, 2012, now Pat. No. 9,004,392, application No. 15/134,254, which is a continuation-in-part of application No. 14/072,539, filed on Nov. 5, 2013, now Pat. No. 9,452,908.

(60) Provisional application No. 61/722,478, filed on Nov. 5, 2012.

(51) Int. Cl.
*B65H 49/32* (2006.01)
*B65H 75/18* (2006.01)
*B65H 75/14* (2006.01)

(52) U.S. Cl.
CPC ......... *B65H 49/324* (2013.01); *B65H 75/146* (2013.01); *B65H 75/18* (2013.01)

(58) Field of Classification Search
CPC ........ B65H 75/18; B65H 75/40; B65H 75/44; B65H 75/146; B65H 49/32; B65H 49/324
See application file for complete search history.

(56) References Cited

U.S. PATENT DOCUMENTS

| 709,932 | A | 9/1902 | Schooley |
| 970,884 | A | 9/1910 | Carter |
| 3,152,772 | A | 10/1964 | Schjerven |
| 3,652,026 | A | 3/1972 | Awebro |
| 3,976,260 | A | 8/1976 | Irik |
| 4,784,221 | A | 11/1988 | Share et al. |
| 8,025,261 | B2 | 9/2011 | Jordan et al. |
| 8,245,965 | B2 | 8/2012 | Andrea et al. |
| 8,444,078 | B1 | 5/2013 | Brown et al. |
| 9,004,392 | B1* | 4/2015 | Bigbee, Jr. ............. B65H 49/32 242/403 |
| 2010/0230528 | A1 | 9/2010 | Singleton |

(Continued)

FOREIGN PATENT DOCUMENTS

GB 353684 A 7/1931

OTHER PUBLICATIONS

Carrisreels, "10-inch Caddies for in-the-box packaging reels from Carris Reels", Carris Reels, Inc. 2008, http://carris.com/products/caddy10.html (Printed from website Oct. 11, 2012).

*Primary Examiner* — William E Dondero
(74) *Attorney, Agent, or Firm* — Warren Rhoades LLP

(57) ABSTRACT

A reel apparatus and method comprising an inner flange assembly, an outer flange assembly, and a bearing assembly coupled to the inner flange assemblies. The inner flange assembly is capable of freely rotating relative to the outer flange assembly. In another embodiment, wire is spooled from a reel assembly comprising an inner flange assembly and an outer flange assembly.

15 Claims, 19 Drawing Sheets

(56) References Cited

U.S. PATENT DOCUMENTS

2011/0095124 A1 4/2011 Andrea et al.
2015/0321876 A1 11/2015 Galindo Gonzalez et al.

* cited by examiner

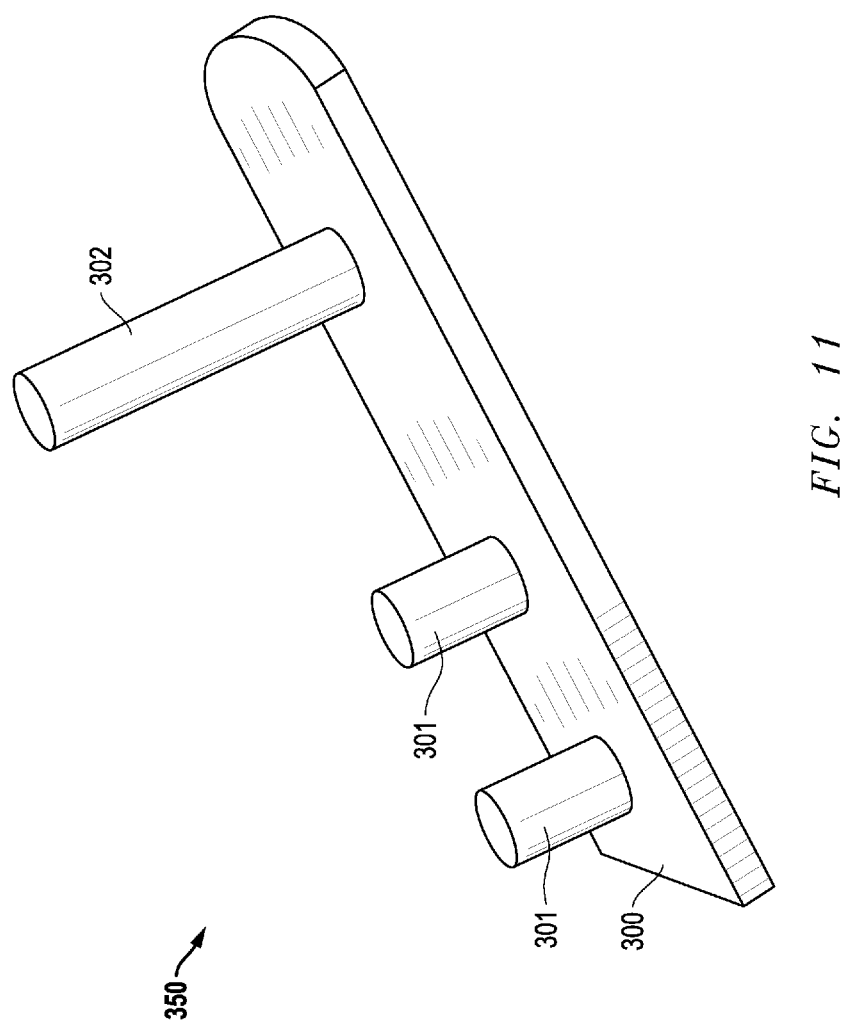

APPARATUS AND METHOD FOR SPOOLING WIRE

CROSS-REFERENCE TO RELATED APPLICATIONS

The subject application is a continuation-in-part of U.S. patent application Ser. No. 14/659,165, filed Mar. 16, 2015 which is a continuation of U.S. patent application Ser. No. 13/545,501, filed Jul. 10, 2012, now issued as U.S. Pat. No. 9,004,392, issued Apr. 14, 2015, and U.S. patent application Ser. No. 14/072,539, filed Nov. 5, 2013 which claims priority to and benefit of U.S. Provisional Application Ser. No. 61/722,478, filed on Nov. 5, 2012, all of which are incorporated in their entirety by reference.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The present disclosure generally relates to apparatuses and methods for spooling wire, and more particularly, to a compact reel assembly capable of spooling wire independent of a jack stand or other reel support or spooling device.

2. Description of Related Art

To distribute electricity throughout a building, insulated electrical wires or cables are installed between a power source and a power distribution box and routed to electrical boxes to supply electricity to a device. Often, these electrical wires or cables are routed through multiple conduits throughout the building spanning great distances. As such, installing electrical wires presents both logistical and mechanical challenges. Wires are typically installed in a building by pulling the wire via pulling cables through the building's infrastructure. The wire is spooled off of a reel assembly during the wire pulling process.

Wire is typically transported from a wire manufacturing site to the building construction or installation site on the reel assembly typically made from metal or wood. These reel assemblies can have diameters of up to 48 inches or more, and are capable of carrying thousands of pounds of wire. At the construction site, construction workers are faced with the challenge of spooling the large bulk of wire from the reel assembly during a wire pull. The size and weight of the reels when carrying cable or wire present many problems associated with installation at the installation site. The reel assembly is usually lifted off of the ground and set upon a pair of jack stands, which allows the reel to freely spin during a wire pull. During a wire pull, one end of the wire is attached to a pulling cable. Today, electric-powered machines are used to apply a pulling tension to the pulling cable, thereby spooling the wire off of the reel and through the building's infrastructure.

The use of jack stands to support the reel assembly during a wire pull has a number of significant disadvantages. For example, it requires heavy machinery or multiple personnel to lift a large reel from the ground to the jack stand platform. This use of heavy machinery is both costly and dangerous to construction workers. Also, jack stands are themselves large pieces of equipment. They are difficult to transport, and when installed, they consume a large amount of floor space at a construction site. For smaller construction sites, the jack stand can present significant space challenges during construction. One solution to the above is to deliver the reel and wire to the construction site on a portable jack stand installed on a flat-bed truck. However, this solution also has many disadvantages. First, the jack stands are large and limit the amount of available flat-bed space to transport multiple reels. Second, flat-bed trucks can take up a large amount of space at a construction site when positioned for spooling. Another solution is to use portable jack stands with built-in lifting mechanisms. However, these jack stands require additional equipment, and again, they can take up an inconvenient amount of space at a construction site while still requiring that the reels be lifted off of the ground and placed in a jack stand. Moreover, this solution requires the use of additional pieces of equipment with associated costs and space requirements.

Moreover, many installations require multiple wires to be dispensed and installed together. Traditionally, this requires a reel for each wire and a jack stand for each reel, which further compounds the issues discussed above.

A prior art solution of dispensing multiple wires includes incorporating multiple bays in one reel, which each wire spooled into each bay. This solution is susceptible to the faults of the prior art solutions discussed above. Additionally, in some installations, at least one wire may be of a different thickness than the remaining wires. In this situation, for each rotation of the reel, more wire of the smaller diameter is dispensed than of the larger diameter wire often causes twists, kinks, or other issues related to efficiently dispensing a plurality of wires for installation at the same time.

Thus, there is need in the art for an apparatus and method that eliminates the need to use a jack stand to spool wire from a reel during a wire pull. There is also need in the art for a reel system that is compact, easily transportable, and capable of spooling wire while resting on the ground or some other surface.

BRIEF SUMMARY OF THE INVENTION

The present disclosure is directed to an apparatus for spooling wire. In a preferred embodiment, the apparatus is a reel assembly comprising an inner flange assembly and an outer flange assembly. The inner flange assembly is supported by the outer flange assembly and capable of freely rotating relative to the outer flange assembly.

In another embodiment, a method is disclosed for spooling wire from a reel. The reel assembly comprises an inner flange assembly and an outer flange assembly. Wire is wrapped around the inner flange assembly for spooling. The inner flange assembly is supported by the outer flange assembly and capable of freely rotating relative to the outer flange assembly. Wire is spooled from the reel assembly while the assembly rests directly on the ground or some other surface.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown.

In the drawings:

FIG. 11 depicts one embodiment of the locking and chocking device of the reel assembly.

DETAILED DESCRIPTION OF THE INVENTION

Figure 1A:
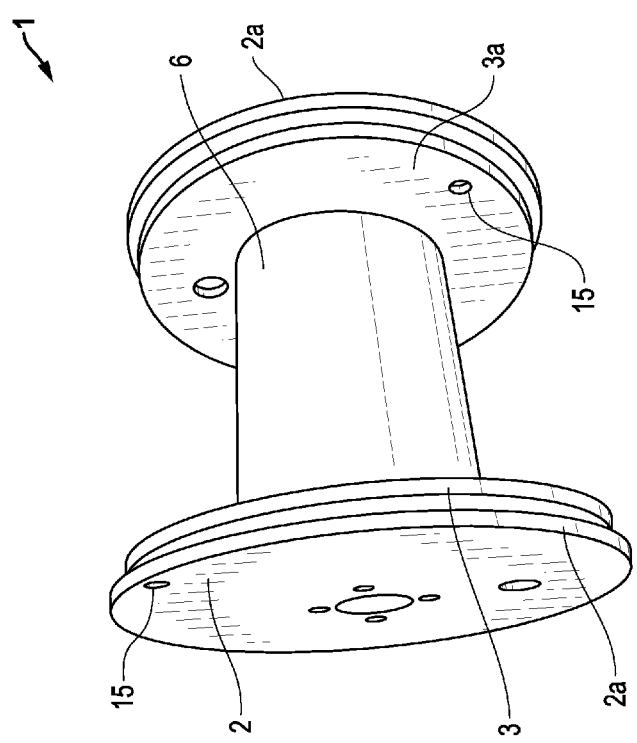
FIGS. 1A-1E illustrate various embodiments of the reel assembly.
Figure 1B:
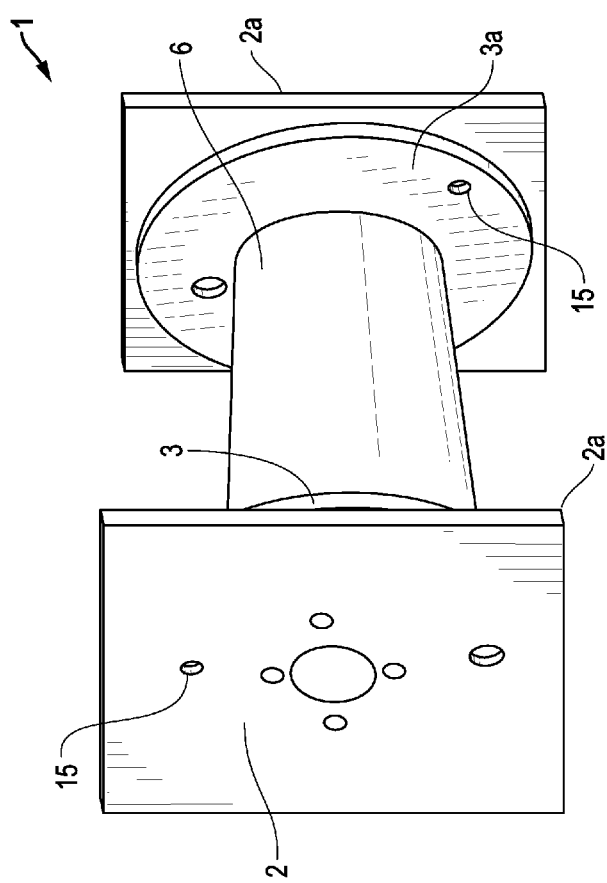
Figure 1C:
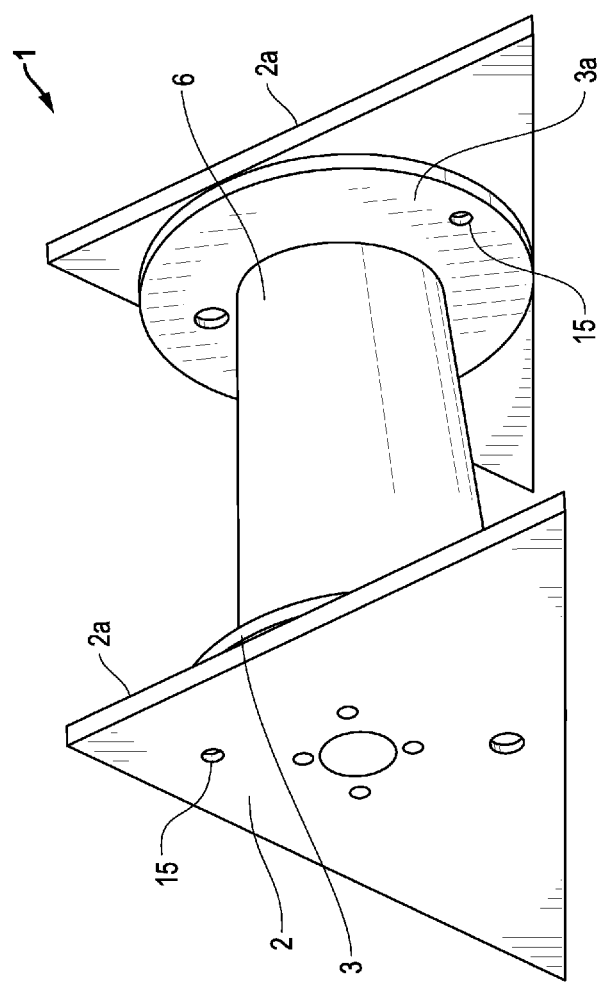
Figure 1D:
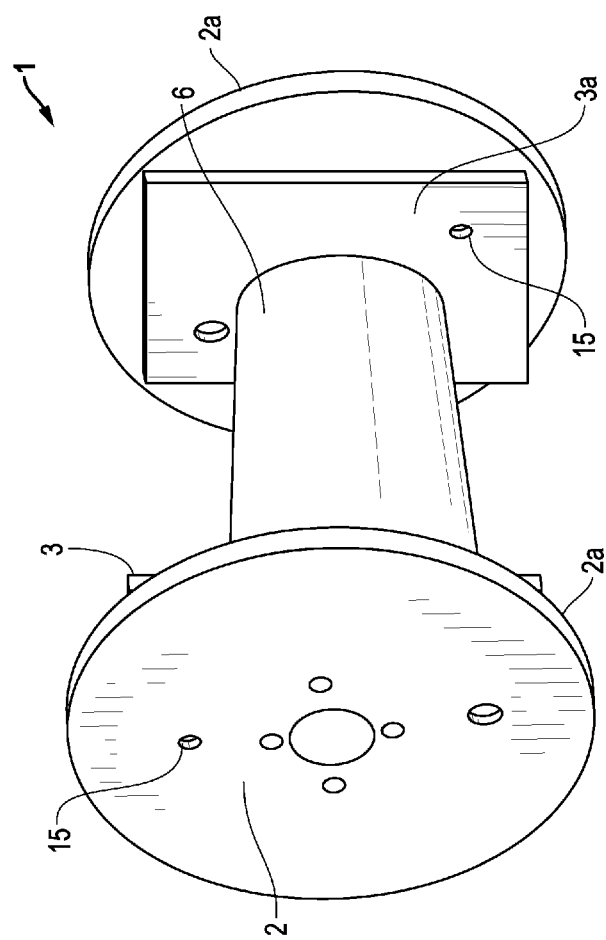
Figure 1E:
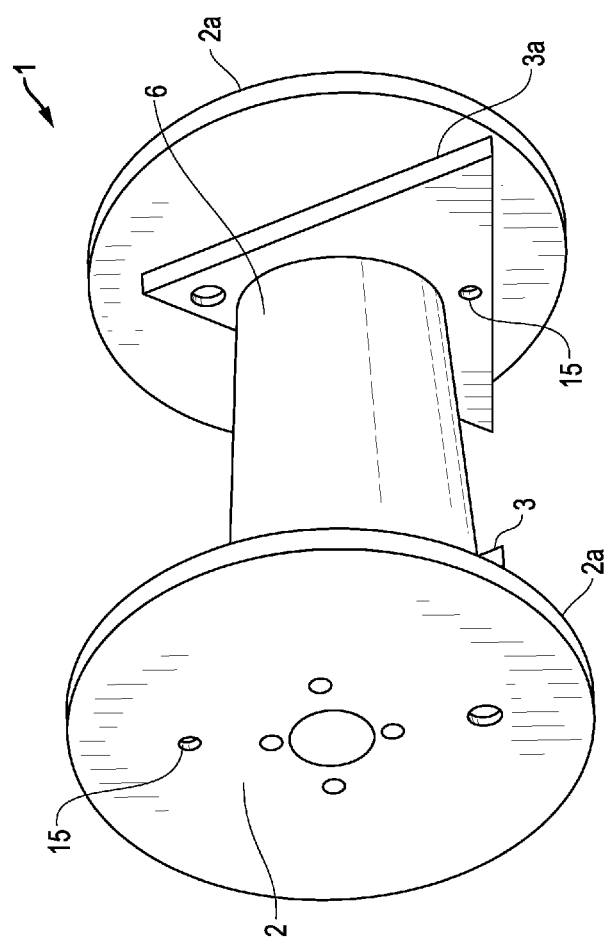
Figure 2:
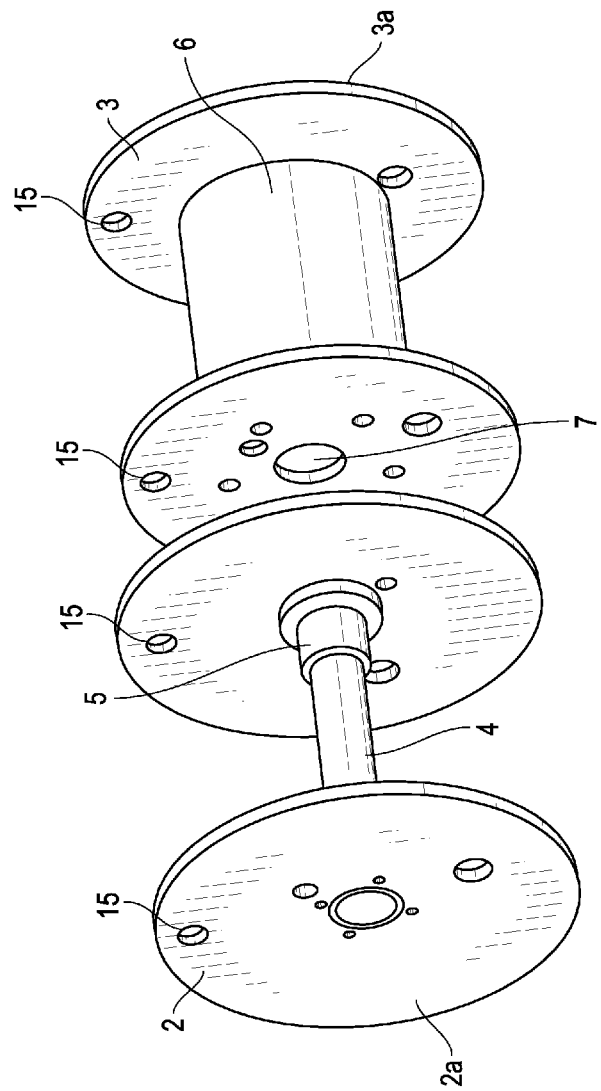
FIG. 2 illustrates the outer and inner flange components of one embodiment of the reel assembly.
Figure 3:
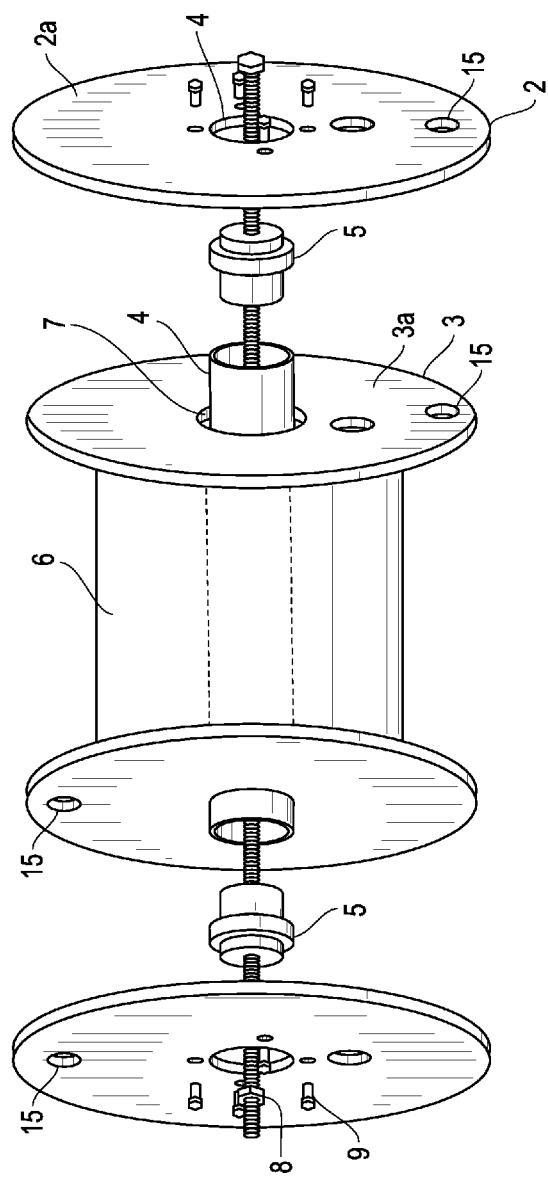
FIG. 3 illustrates one embodiment of the reel assembly.
Figure 4:
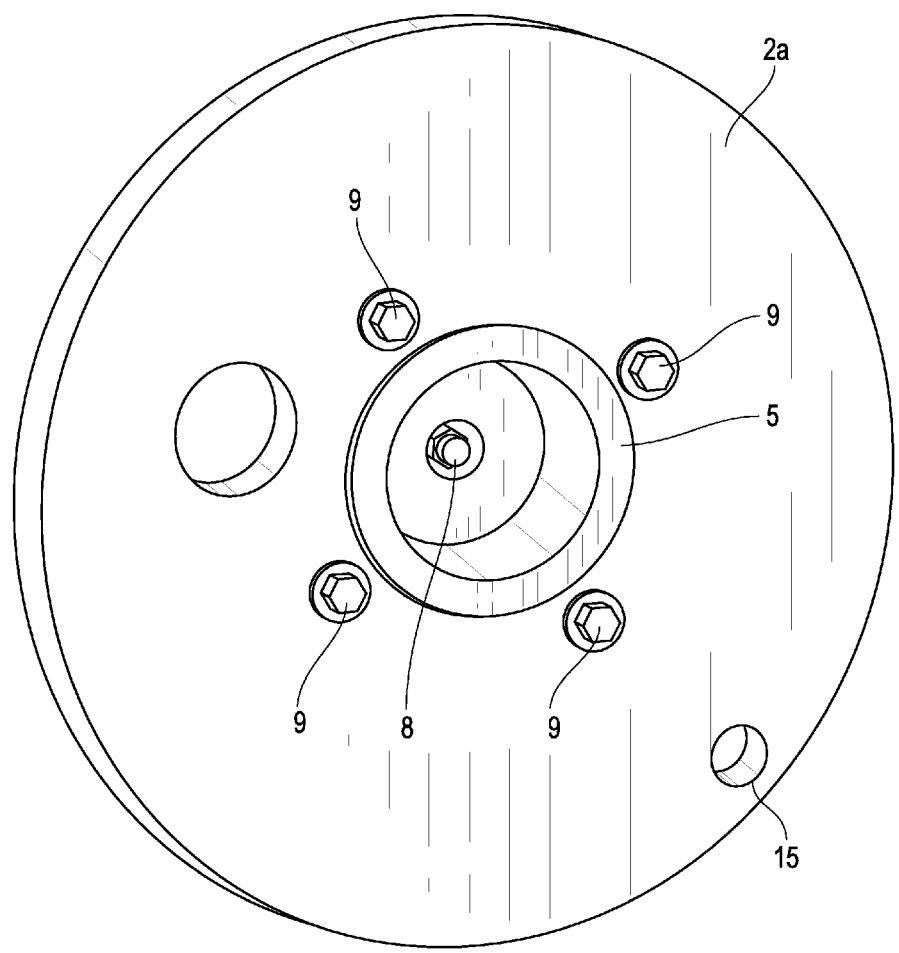
FIG. 4 illustrates one embodiment of a bearing and outer flange attachment.
Figure 5:
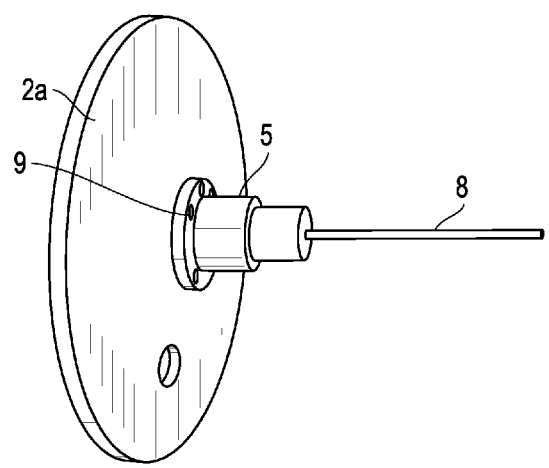
FIG. 5 illustrates one embodiment of a bearing and outer flange attachment.
Figure 6:
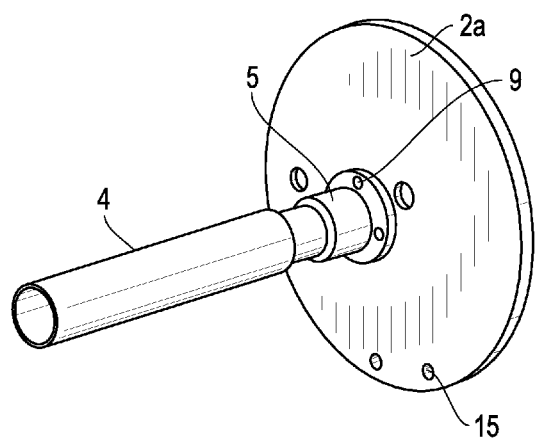
FIG. 6 illustrates one embodiment of a bearing and outer flange attachment.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It should be understood that any one of the features of the invention may be used separately or in combination with other features. Other systems, methods, features, and advantages of the present invention will be or become apparent to one with skill in the art upon examination of the drawings and the detailed description. It is intended that all such additional systems, methods, features, and advantages be included within this description, be within the scope of the present invention, and be protected by the accompanying claims.

The present disclosure is described below with reference to the Figures in which various embodiments of the present invention are shown. The subject matter of the disclosure may, however, be embodied in many different forms and should not be construed as limited to the exemplary embodiments set forth herein. It is also understood that the term "wire" is not limiting, and refers to wires, cables, electrical lines, or any other materials that are spooled from a reel.

The present disclosure is directed to an apparatus and method for spooling wire. In a preferred embodiment, the apparatus is a reel assembly comprising an inner flange assembly and an outer flange assembly. The inner flange assembly is supported by the outer flange assembly and capable of freely rotating relative to the outer flange assembly. With this design, wire can be spooled from the reel assembly while the assembly rests directly on the ground or some other surface.

Referring to FIGS. 1A-1E, 2 and 3 by way of non-limiting example, and consistent with embodiments of the invention, a reel assembly 1 is shown. The reel assembly 1 comprises two major components—an outer flange assembly 2 and an inner flange assembly 3. The outer flange assembly 2 comprises two outer supporting walls 2a of substantially equal shape and size connected by a bearing assembly comprising a tube 4 and bearings 5. The outer supporting 2a walls can be various shapes, including but not limited to circular, quadrilateral, or triangular. In a preferred embodiment, the outer supporting walls 2a are circular.

The inner flange assembly 3 also comprises two inner supporting walls 3a of substantially equal shape and size connected by a spooling seat 6. The inner supporting walls 3a of the inner flange assembly 3 can also be various shapes, including but not limited to circular, quadrilateral, or triangular. In a preferred embodiment, the inner supporting walls 3a are circular. Furthermore, in a preferred embodiment, the inner supporting walls 3a are slightly smaller than the outer supporting walls 2a. For example the overall dimensions of the inner supporting walls 3a are less than the outer supporting walls 2a to allow free spinning of the inner flange assembly 3 relative to the outer flange assembly 2. The distance between the inner supporting walls 3a is designed to be slightly smaller than the distance between the outer supporting walls 2a. As such, the inner flange assembly 3 is designed to fit within the outer flange assembly 2 between the outer supporting walls 2a. The inner flange assembly 3 further comprises a bore 7 through the center of the inner supporting walls 3a and spooling seat 6. The bore 7 is designed to receive the tube 4 of the outer flange assembly 2 so that the inner flange assembly 3 is supported by the outer flange assembly 2.

When assembled, the inner flange assembly 3 is capable of freely rotating about the bearing assembly. As the inner flange assembly 3 rotates the outer flange assembly 2 remains stationary. In this way, wire can be spooled from the reel assembly while the assembly rests on the ground or any other surface.

The outer supporting walls 2a are connected via a bearing assembly comprising a tube 4, bearings 5, a long bolt 8 and attachment bolts 9. The tube 4 and bearings 5 can be made of any number of materials, including but not limited to steel, plastics or polyacetal. In a preferred embodiment, the bearings 5 are made of polyacetal, which has low weight and has low coefficients of friction, and the tube 4 is made of steel. Referring to FIGS. 3-6 by way of non-limiting example, and consistent with embodiments of the invention, the bearings 5 are connected to the inner surfaces of the outer supporting walls 2a. It is understood by a person of ordinary skill in the art that any number of means can be used to attach the bearings 5 to the outer supporting walls 2a, including but not limited to bolts, screws or glues. In a preferred embodiment the bearings 5 are fastened to the outer supporting walls 2a via attachment bolts 9. Each end of the tube 4 is connected to a surface of each of the bearings 5 wherein the tube 4 and bearings 5 are adapted to allow the inner flange assembly 3 to freely rotate. The outer supporting walls 2a are secured to the bearings 5 via a long bolt 8 such that the tube 4 is sandwiched on and between bearings 5. The long bolt passes from one of the outer supporting walls 2a, through a first bearing 5, through the tube 4, through a second bearing 5, and through a second outer supporting wall 2a.

Figure 7:
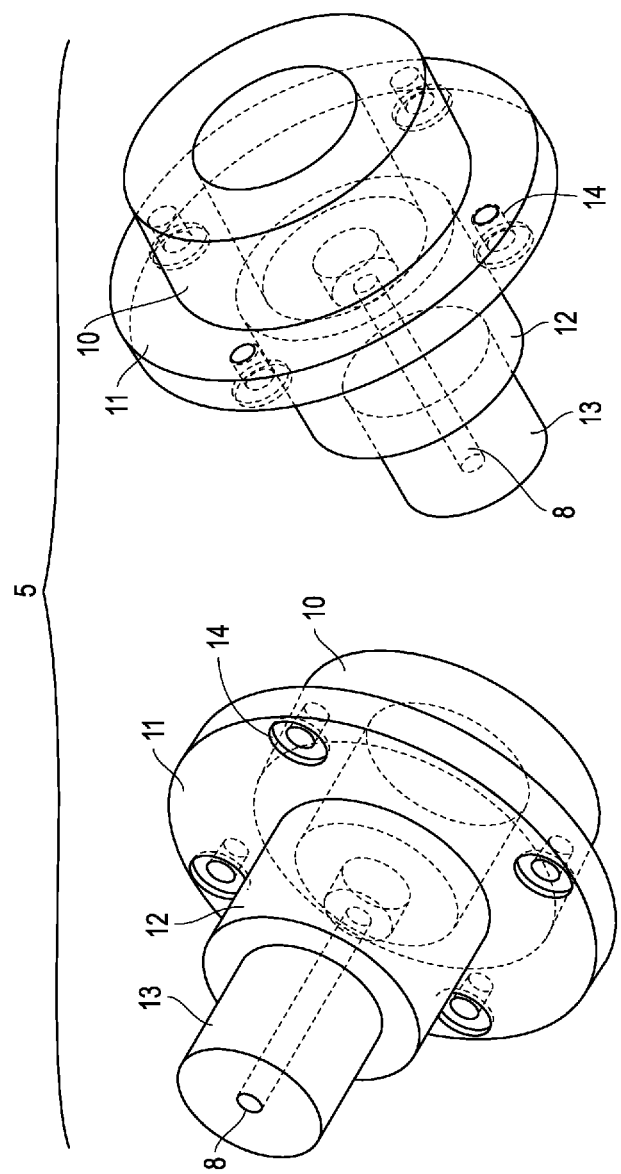
FIG. 7 illustrates one embodiment of a bearing.

A preferred embodiment of the bearings 5 is depicted in FIG. 7. The bearings 5 comprise primarily four stages 10, 11, 12 and 13. The first stage 10 is designed to mate with a bore of an outer supporting wall 2a. The second stage 11 includes bolt holes 14 and is designed to secure the bearings 5 to the inner surface of the outer supporting wall 2a. The third stage 12 is designed to maintain a separation between the inner supporting walls 3a of the inner flange assembly 3 and the outer supporting walls 2a of the outer flange assembly 2. In this way, the inner flange assembly 3 is able to freely rotate relative to the outer flange assembly 2. Finally, the fourth stage 13 is sized to mate with the tube 4.

Figure 8:
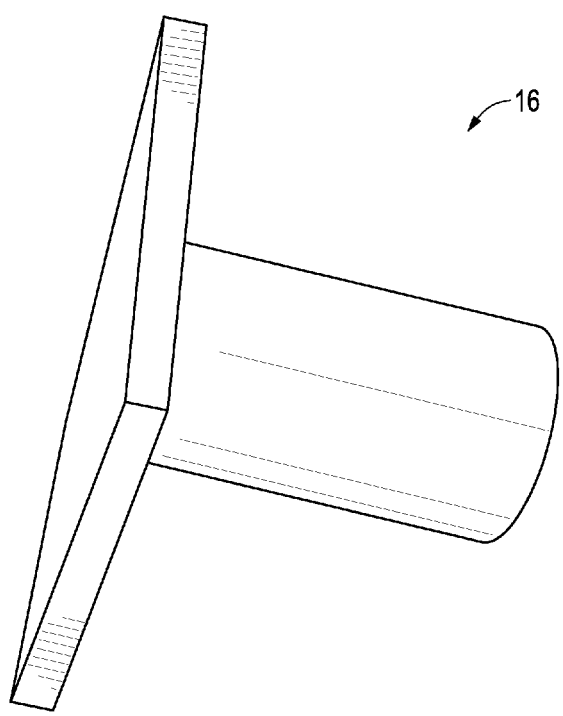
FIG. 8 illustrates one embodiment of a plug for preventing rotation of the inner flange assembly.

In an alternative embodiment, the outer supporting walls 2a and inner supporting walls 3a comprise holes 15 to receive a plug 16. As shown in FIG. 8, a plug 16 is designed to fit through the outer supporting wall and inner supporting wall holes 15 (see FIGS. 1, 2, 3). When the plug 16 is placed through the holes 15 in both the outer supporting wall 2a and the inner supporting wall 3a the inner flange assembly 3 is secured in a locked position to the outer flange assembly 2 and thereby unable to freely rotate.

In another embodiment of the invention, wire is spooled from the reel assembly 1 during a wire pulling event. The reel assembly 1 comprises an inner flange assembly 3 and an outer flange assembly 2. Wire is wrapped around the inner flange assembly 3 for spooling. The inner flange assembly 3 is supported by the outer flange assembly 2 and capable of freely rotating relative to the outer flange assembly 2. Wire is spooled from the reel assembly 1 while the assembly rests directly on the ground or some other surface.

Figure 9:
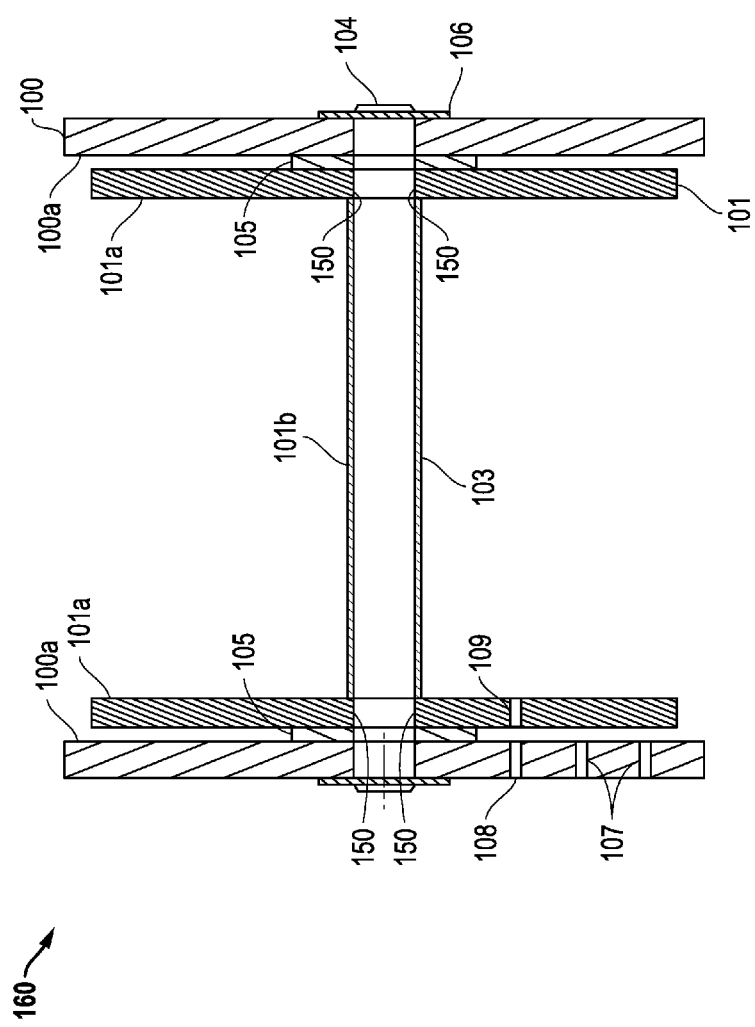
FIG. 9 depicts one embodiment of the reel assembly.
Figure 10:
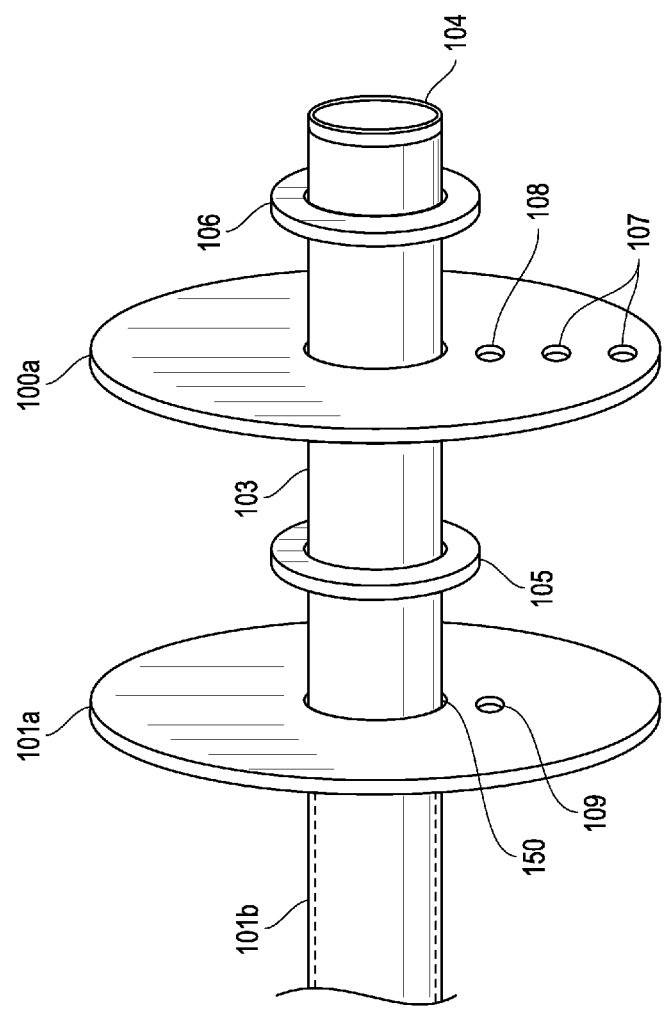
FIG. 10 depicts the outer and inner flange components of one embodiment of the reel assembly.

Referring to FIGS. 9 and 10 by way of a non-limiting example, and consistent with the embodiments of the invention, a reel assembly 160 is shown. The reel assembly 160 has an outer flange assembly 100, an inner flange assembly 101 and a pipe 103. The outer flange assembly 100 includes two outer supporting walls 100a of substantially equal size and shape connected to the pipe 103 with an outer washer 106. The outer washer 106 may be formed from a wide variety of materials including, but not limited to, wood, plastic and metal. The end of the pipe 103 is machined to form a lip 104 that has a diameter larger than the inner diameter of the outer washer 106, thus enclosing all outer flange assembly 100 components and securing the supporting walls 100a to the pipe 103. It is understood to one skilled in the art that a wide variety of enclosing means may be implemented without detracting from the spirit of the invention including, but not limited to, the use of a threaded pipe and nut. The outer supporting walls 100a can be various shapes, including but not limited to circular, quadrilateral, or triangular. In one embodiment, the outer supporting walls 100a are circular.

The inner flange assembly 101 is formed by at least two inner supporting walls 101a of substantially equal size and shape connected by an inner drum 101b with an internal radius greater than the radius of the pipe 103. The inner supporting walls 101a of the inner flange assembly 101 can also be various shapes, including but not limited to circular, quadrilateral, or triangular. Additionally, the inner supporting walls 101a can be bolted to the inner drum 101b or can be connected to the inner drum 101b in a variety of methods known to those skilled in the art. In one disclosed embodiment, the inner supporting walls 101a are circular. Furthermore, in one disclosed embodiment, the inner supporting walls 101a are smaller than the outer supporting walls 100a. For example, the overall dimensions of the inner supporting walls 101a are less than the outer supporting walls 100a to allow free spinning of the inner supporting walls 101a relative to the outer flange assembly 100 when the inner flange assembly 101 is inserted over the pipe 103. The distance between the inner supporting walls 101a is less than the distance between the outer supporting walls 100a such that the inner flange assembly 101 is designed to fit within the outer supporting walls 100a. An inner washer 105 separates the inner supporting walls 101a from the outer supporting walls 100a. The inner washer 105 may be formed from a wide variety of materials including, but not limited to, wood, plastic and metal. The drum 101b of the inner flange assembly 101 is designed such that the inner diameter of the drum 101b is slightly larger than the outside diameter of the pipe 103 to allow free rotation without significant play.

In one disclosed embodiment, the outer supporting walls 101b include outer openings or holes 107 and an inner opening or hole 108. The inner supporting walls 101a include an inner hole 109 which can be aligned with inner hole 108. The inner hole 108 in the outer supporting wall 100a and the inner hole 109 in the inner supporting wall 101a are of the same size and shape and the same distance away from the centerline of the reel assembly 160. The outer holes 107 in the outer supporting wall 100a are of a similar size and shape relative to each other, and are of a distance further from the centerline than the inner hole 108.

Referring to FIGS. 9-12B by way of non-limiting example, and consistent with embodiments of the invention, the locking and chocking device 350 includes a base 300, minor pegs 301 and major peg 302 which are welded to the base 300. One skilled in the art understands that a wide variety of methods to attach the minor pegs 301 and major peg 302 to base 300 are known and include, but are not limited to, formation of a stamped locking and chocking device 350. Minor pegs 301 are of substantially similar size and shape. The outside diameter of the minor pegs 301 is smaller than the inside diameter of the outer holes 107 on the outer support walls 100a and are long enough to extend through the width of the outer support walls 100a. The outside diameter of the major peg 302 is smaller than the inside diameters of the inner holes on 108 and 109. The length of the major peg 302 is longer than the width of the outer support wall 100a, the inner washer 105 and at least some of the width of the inner support wall 101a. In one disclosed embodiment, the cross-section of the minor pegs 301 and major peg 302 are circular, however a wide variety of cross-section shapes may be implemented without detracting from the spirit of the invention, including, but not limited to, square, triangular, and quadrilateral. The locking and chocking device 350 can be formed of steel or other materials known to those skilled in the art.

When assembled, the inner flange assembly 101 is capable of freely rotating about the pipe 103. In one disclosed embodiment, the drum 101b and pipe 103 are connected via a lubrication barrier 150, however a wide variety of connection mechanisms may be implemented without detracting from the spirit of the invention, including, but not limited to, bearings or direct contact. In another disclosed embodiment, the inner supporting walls 101a contact and rotate around the pipe 103. A lubricant 150 may be applied between the inner supporting walls 101a and the pipe 103 to allow for freer rotation. As shown in FIG. 12B, the locking and chocking mechanism 350 is used to impede movement of the reel assembly 160 while still allowing the inner flange assembly 101 to rotate freely about the pipe 103 by inserting the locking and chocking mechanism 350 in an orientation such that the minor pegs 301 are placed into the outer holes 107 and the bar 300 of the locking and chocking mechanism 350 extends beyond the outermost point of the outer support wall 100a. In this configuration, the bar 300 and the major peg 302 contact the ground or other surface on which the reel assembly 160 has been placed and impedes the movement of the reel assembly 160. This allows the dispensing of wire by a freely rotating inner flange assembly 101 while the outer flange assembly 100 and the entire reel assembly 160 remain stationary.

Figure 12A:
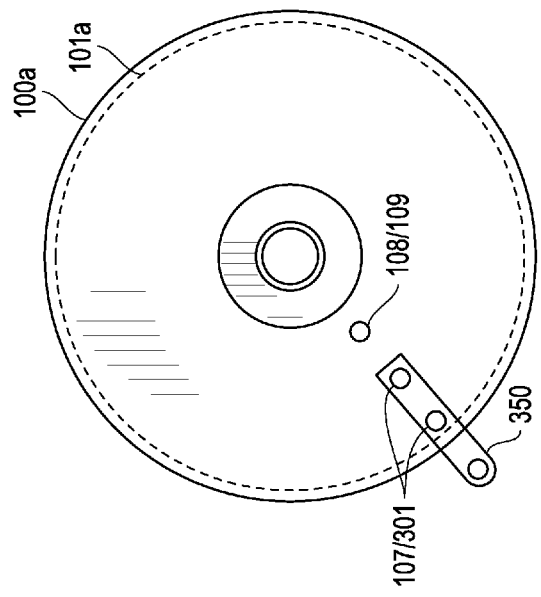
FIGS. 12A-12B depict embodiments of the reel assembly illustrating the locking and chocking device in conjunction with the reel assembly.
Figure 12B:
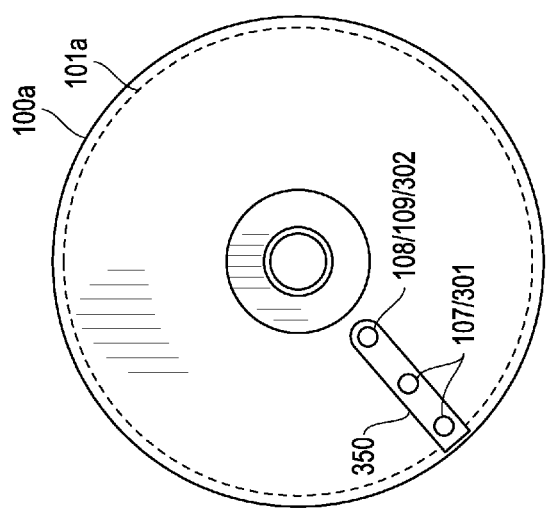

As shown in FIG. 12A, the inner flange assembly 101 is unable to rotate by use of the locking and chocking mechanism 350 and is contemplated for transportation of the reel assembly 160. To prevent the free rotation of the inner flange assembly 101 by the locking and chocking mechanism 350, the locking and chocking mechanism 350 is inserted with an orientation such that the minor pegs 301 align with the outer holes 107 and the major peg 302 is aligned with the inner holes 108 and 109. The locking and chocking mechanism 350 is inserting into the outer holes 107 and the inner holes 108 and 109 which must be aligned. In this configuration, the major peg 302 penetrates the inner hole 108 of the outer support wall 100a and the inner hole 109 of the inner support wall 101a, and thus impedes the ability of the inner flange assembly 101 from rotating freely relative to the outer flange assembly 100.

In another embodiment of the invention, a method of dispensing wire from a reel is provided. The wire is dispensed from the reel assembly 160 during a wire pulling event. The reel assembly 160 comprises an inner flange assembly 101 and an outer flange assembly 100. Wire is wrapped around the inner flange assembly 101 for dispensing. The inner flange assembly 101 is supported by the outer flange assembly 100 and capable of freely rotating relative to the outer flange assembly 100. Wire is dispensed from the reel assembly 160 while the assembly rests directly on the ground or some other surface. The locking and chocking device 350 is inserted into the outer holes 107 in the orientation that allows the major peg 302 to extend beyond the outer flange assembly 100 and contact the surface or ground. The contact of the major peg 302 with the surface or ground impeded the rotation of the outer flange assembly 100.

In another embodiment of the invention, another method of dispensing wire from a reel is provided. A reel assembly 160 containing wire is transported to a wire dispensing site. The reel assembly 160 is placed upon the ground or any available surface. The reel assembly 160 does not need to be placed in a reel jack stand or a pre-manufactured pallet. The reel assembly 160 can be placed upon any surface. The locking and chocking device 350 is removed. During transportation, the locking and chocking device 350 is oriented so the major peg contacts both the outer flange assembly 100 and inner flange assembly 101, thus preventing rotational movement. The locking and chocking device 350 is reinserted for chocking. The orientation of the locking and chocking device 350 for chocking allows for the minor pegs 301 to contact the outer flange assembly 100 without the major peg 302 contacting the inner flange assembly 101. In such an orientation, the inner flange assembly 101 is independently rotatable from the outer flange assembly 100. In this orientation, the major peg 302 extends from the outer flange assembly 100 and contacts the ground, preventing or impeding rotational movement of the outer flange assembly 100. Wire is drawn from the reel assembly 160.

Figure 14:
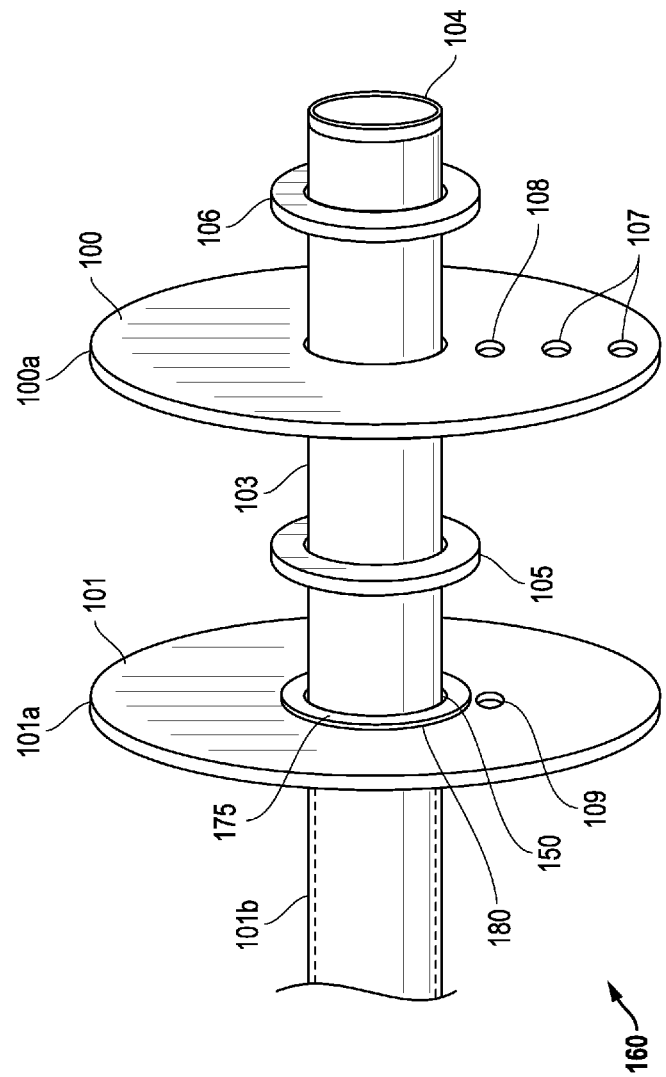
FIG. 14 illustrates the outer and inner flange components of one embodiment of the reel assembly.
Figure 15:
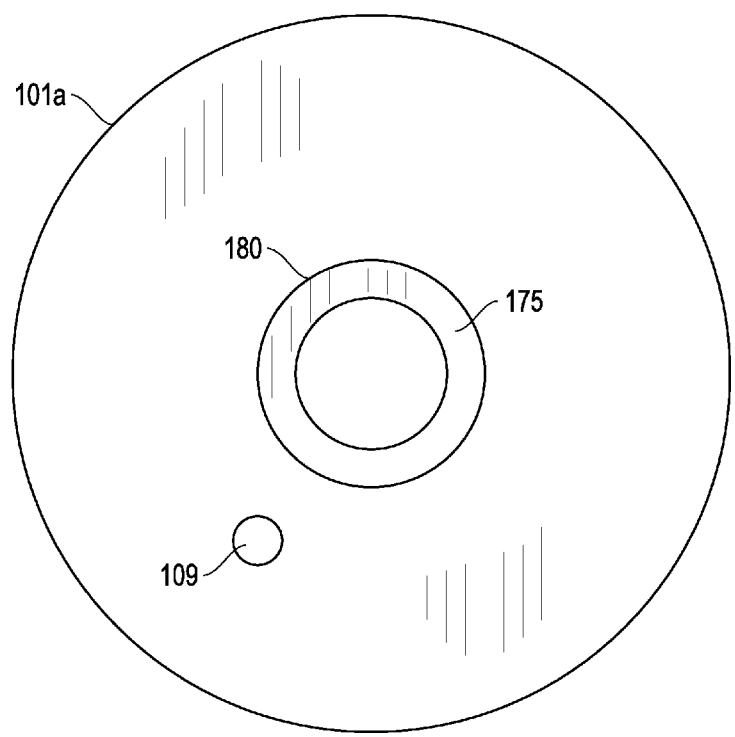
FIG. 15 illustrates an end view of an inner flange assembly according to one embodiment of the invention.

Referring now to FIGS. 14-15, various embodiment of the present invention are shown. One side of a reel assembly 160 is shown. The reel assembly 160 has an outer flange assembly 100, an inner flange assembly 101 and a pipe 103. The outer flange assembly 100 includes two outer supporting walls 100a of substantially equal size and shape connected to the pipe 103 with an outer washer 106. The inner flange assembly 101 is formed by at least two inner supporting walls 101a of substantially equal size and shape connected by an inner drum 101b with an internal radius greater than the radius of the pipe 103. In this embodiment, a bearing 175 is attached to the inner supporting walls 101a. The bearing 175 may be formed from a variety of materials including, but not limited to, plastic, metal or steel and may be impregnated with a lubricating oil. In this embodiment, the steel bearing 175 is pressed into the inner supporting walls 101a. In one embodiment, the bearing 175 includes a flared end 180 to attach to the inner supporting wall 101a. The bearing 175 and inner supporting walls 101a are connected to the inner drum 101b using mechanisms known to those skilled in the art. The pipe 103 is passed through the inner drum 101b. Furthermore, in one embodiment, the inner supporting walls 101a are smaller than the outer supporting walls 100a. An inner washer 105 or separator separates the inner supporting walls 101a from the outer supporting walls 100a. The drum 101b of the inner flange assembly 101 is designed such that the inner diameter of the drum 101b is slightly larger than the outside diameter of the pipe 103 to allow free rotation without significant play. In one embodiment, a lubrication barrier or lubricant 150 may be applied to the pipe 103. A wide variety of lubricants may be implemented without detracting from the spirit of the invention. In the embodiment implementing the steel bearing 175, a graphite lubricant may be implemented between the pipe 103 and the steel bearing 175.

Figure 16A:
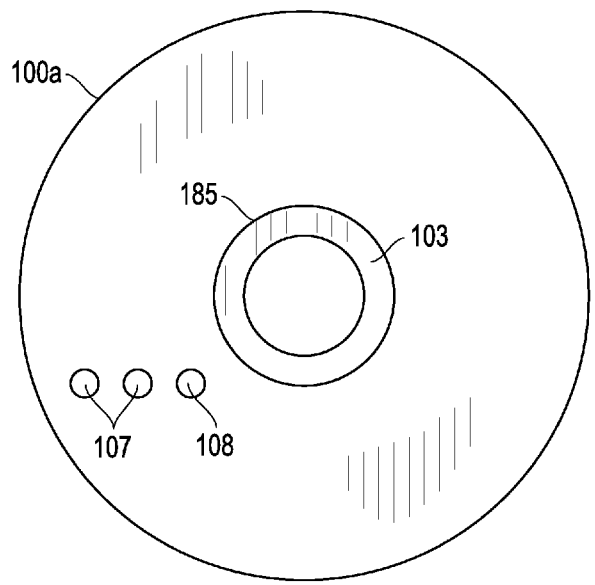
FIGS. 16A-16B illustrate end views of an outer flange assembly according to embodiment of the invention.
Figure 16B:
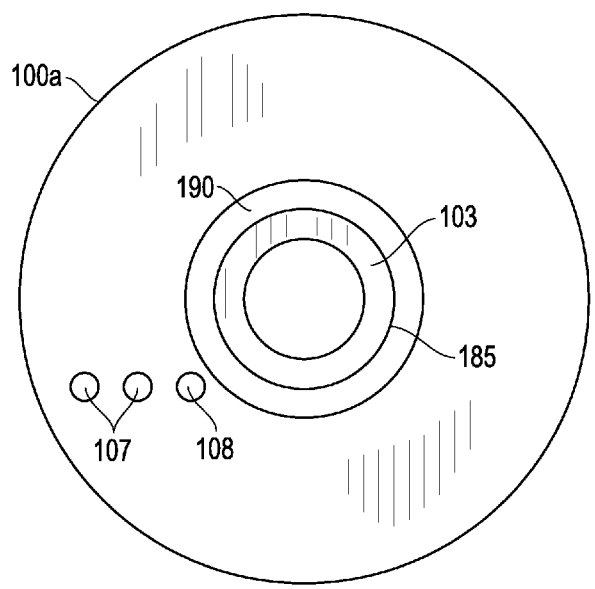

Referring now to FIGS. 16A-16B, another embodiment of the present invention is shown. An outer supporting wall 100a is shown. The outer supporting wall 100a is connected to the pipe 103. In one embodiment, the pipe 103 has a flared end 185 which attaches the pipe 103 to the outer supporting wall 100a. In another embodiment, the pipe 103 has a flared end 185 which connects to the outer washer 106 when the pipe 103 is attached to the outer supporting wall 100a.

Figure 13:
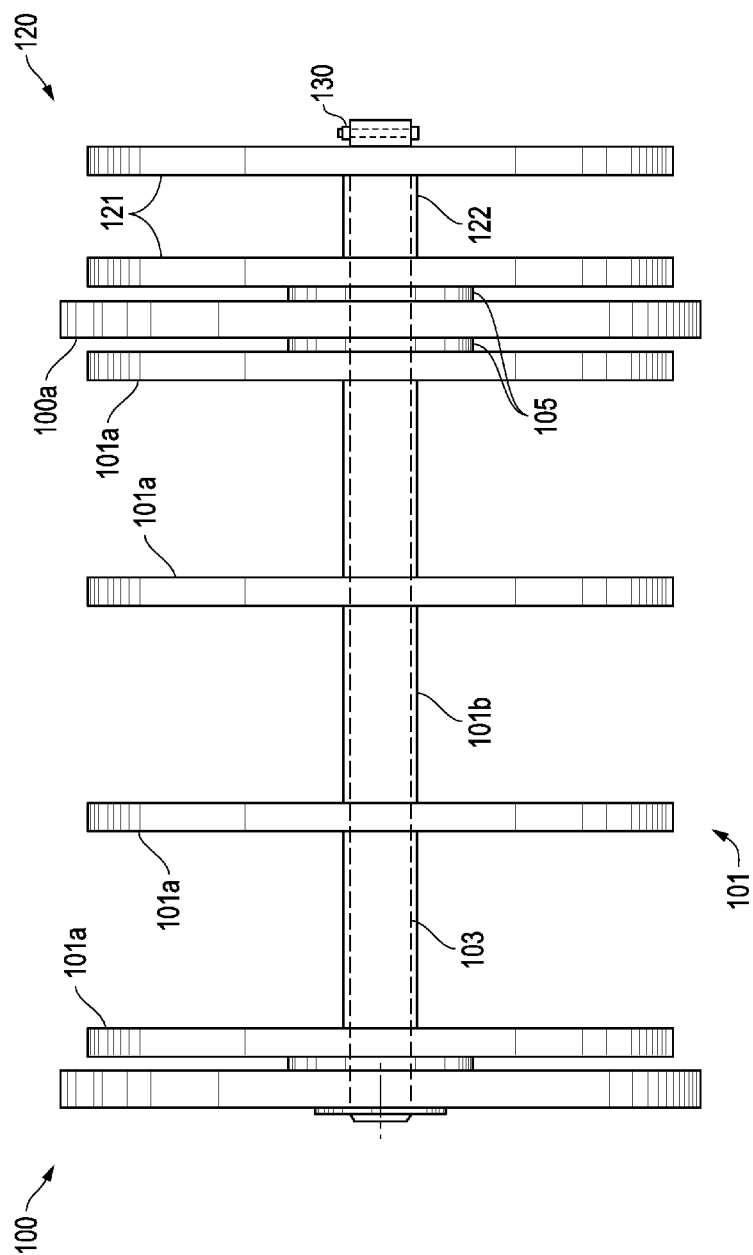
FIG. 13 depicts one embodiment of the reel assembly.

Referring now to FIG. 13, another embodiment of present invention is shown. Reel assembly 160 includes an outer assembly 100 and an inner assembly 101. As discussed herein, the outer assembly 100 is formed by two outer supporting walls 100a. Inner assembly 101 is formed by a plurality of inner supporting walls 101a, which form at least two bays in the inner assembly 101. Each of the inner supporting walls 101 is connected to the inner drum 101b and all inner support walls 101 move in unison in a way that is independent from the outer assembly 100. In this configuration, a variety of different wire types may be spooled in each bay of the inner assembly 101 allowing for a plurality of wires to be pulled during installation. In another disclosed embodiment, an external bay 120 is attached to the reel assembly 160 outside of the outer flange assembly 100 and a washer 105 may also be placed between the outer flange assembly 100 and the external bay 120. In this embodiment, the external bay would move independently of the inner flange assembly 101 which is contained within the outer flange assembly. The external bay 120 is formed by a two supporting walls 121 and a drum 122 that may be similar to the inner flange assembly 101 and drum 101b disclosed herein. In this embodiment, the rotatable bay 120 outside of the outer flange assembly may be removable from the reel assembly 160 and reattached as needed during installation of the wire. In this embodiment, the external bay 120 may be secured to the reel assembly 160 by a pin or bolt 130 inserted into a hole in the pipe 103. One skilled in the art understands that a wide variety of methods to secure the external bay 120 to the reel assembly 160 are known and include, but are not limited to, securing pins or threaded pipe caps.

In another embodiment of the present invention, at least one bay of the inner assembly 101 can move independently from the remaining bays of the inner assembly 101. In this embodiment, the inner drum 101*b* is separated in such a way that the bays of the inner assembly can move independently. In this embodiment, the locking and chocking device 350 must be configured such that it would interact with at least two bays of the inner assembly to securely connect them to the outer assembly 100 during transportation. In another embodiment, a plurality of locking and chocking devices 350 is employed such that each freely rotatable bay or assembly is securely connected to the outer flange assembly 100 during transportation.

One skilled in the art will recognize that different embodiments may be formed in a similar manner having different characteristics depending upon need, performance, or some other criteria. It will thus be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A reel apparatus comprising:
   an inner flange assembly;
   an outer flange assembly, wherein the outer flange assembly comprises two outer support walls connected by a pipe and wherein the two outer supporting walls are connected by a flared end to the pipe;
   a bearing assembly coupled to the inner and outer flange assemblies, wherein the bearing assembly is a steel bearing assembly; and
   wherein the inner flange assembly is capable of freely rotating relative to the outer flange assembly.

2. The apparatus of claim 1, wherein the inner flange assembly comprises at least two inner supporting walls connected by a drum, wherein the diameter of the pipe is less than the diameter of the drum and wherein the pipe passes through the drum.

3. The apparatus of claim 2 further comprising a separator, the separator positioned between the inner flange assembly and the outer flange assembly.

4. The apparatus of claim 2, wherein the inner supporting wall diameters are less than the outer supporting wall diameter.

5. The apparatus of claim 1 further comprising a lubricant positioned between the pipe and steel bearing assembly.

6. The apparatus of claim 5, wherein the lubricant is a graphite lubricant.

7. The apparatus of claim 1 further comprising a washer connected to the flared end of the pipe and the outer support wall.

8. The apparatus of claim 1, wherein the inner flange assembly width is less than the outer flange assembly width.

9. The apparatus of claim 1, wherein the bearing assembly is coupled to the inner flange assembly through a flared end of the bearing assembly.

10. A method of spooling wire, comprising:
    spooling wire from a reel assembly; and
    wherein the reel assembly comprises an inner flange assembly, an outer flange assembly wherein the outer flange assembly comprises two outer supporting walls connected by a pipe and wherein the two outer supporting walls are connected by a flared end to the pipe, a bearing assembly coupled to the inner flange assembly, and wherein the inner flange assembly is capable of freely rotating relative to the outer flange assembly.

11. The method of claim 10, wherein the inner flange assembly comprises two inner supporting walls connected by a drum.

12. The method of claim 11, wherein the bearing assembly is a steel bearing assembly.

13. The method of claim 12, wherein the steel bearing assembly is pressed into the inner supporting wall.

14. The method of claim 12, wherein the steel bearing assembly is coupled to the inner supporting walls through a flared end of the steel bearing assembly.

15. The method of claim 10 further comprising a washer connected to the flared end of the pipe and the outer support wall.

* * * * *